United States Patent [19]
Prescott

[11] Patent Number: 5,413,136
[45] Date of Patent: May 9, 1995

[54] INFLATABLE ELASTOMERIC VALVE HAVING A SPHERICAL CONFIGURATION

[76] Inventor: Kevin B. Prescott, 767 Salem St., Groveland, Mass. 01834

[21] Appl. No.: 222,449

[22] Filed: Apr. 4, 1994

[51] Int. Cl.⁶ .................... F16L 55/128; F16K 7/10
[52] U.S. Cl. .................... 137/68.1; 137/362; 251/61.1; 138/93
[58] Field of Search .............. 137/68.1, 362; 251/61.1; 138/93

[56] References Cited

U.S. PATENT DOCUMENTS

| | | | |
|---|---|---|---|
| 3,107,687 | 10/1963 | Howe | 137/362 |
| 3,129,726 | 4/1964 | Moore | 138/93 X |
| 3,542,057 | 11/1970 | Stalano | 137/362 X |
| 4,021,265 | 5/1977 | Guenther | 138/93 X |
| 4,026,329 | 5/1977 | Thompson | 138/93 X |
| 4,671,518 | 6/1987 | Retz | 138/93 X |
| 5,033,511 | 7/1991 | Cacciuttolo et al. | 138/93 X |
| 5,131,433 | 7/1992 | Sion et al. | 138/93 |
| 5,209,266 | 5/1993 | Hiemsoth | 138/93 X |

*Primary Examiner*—John Rivell
*Attorney, Agent, or Firm*—Frederick R. Cantor

[57] ABSTRACT

A portable inflatable valve is provided for disposition in a floor drain opening to prevent the undesired flow of toxic liquids into the drain opening. The valve includes a rigid support structure adapted to rest on the floor surface above the drain opening. A pressurized gas cylinder is located below the rigid support structure for pressuring a surrounding elastomeric sock into sealing contact with the hole side surface. Actuation of the gas cylinder is accomplished by a manual plunger arranged for downward motion to puncture a foil closure on the upper end of the gas cylinder.

10 Claims, 1 Drawing Sheet

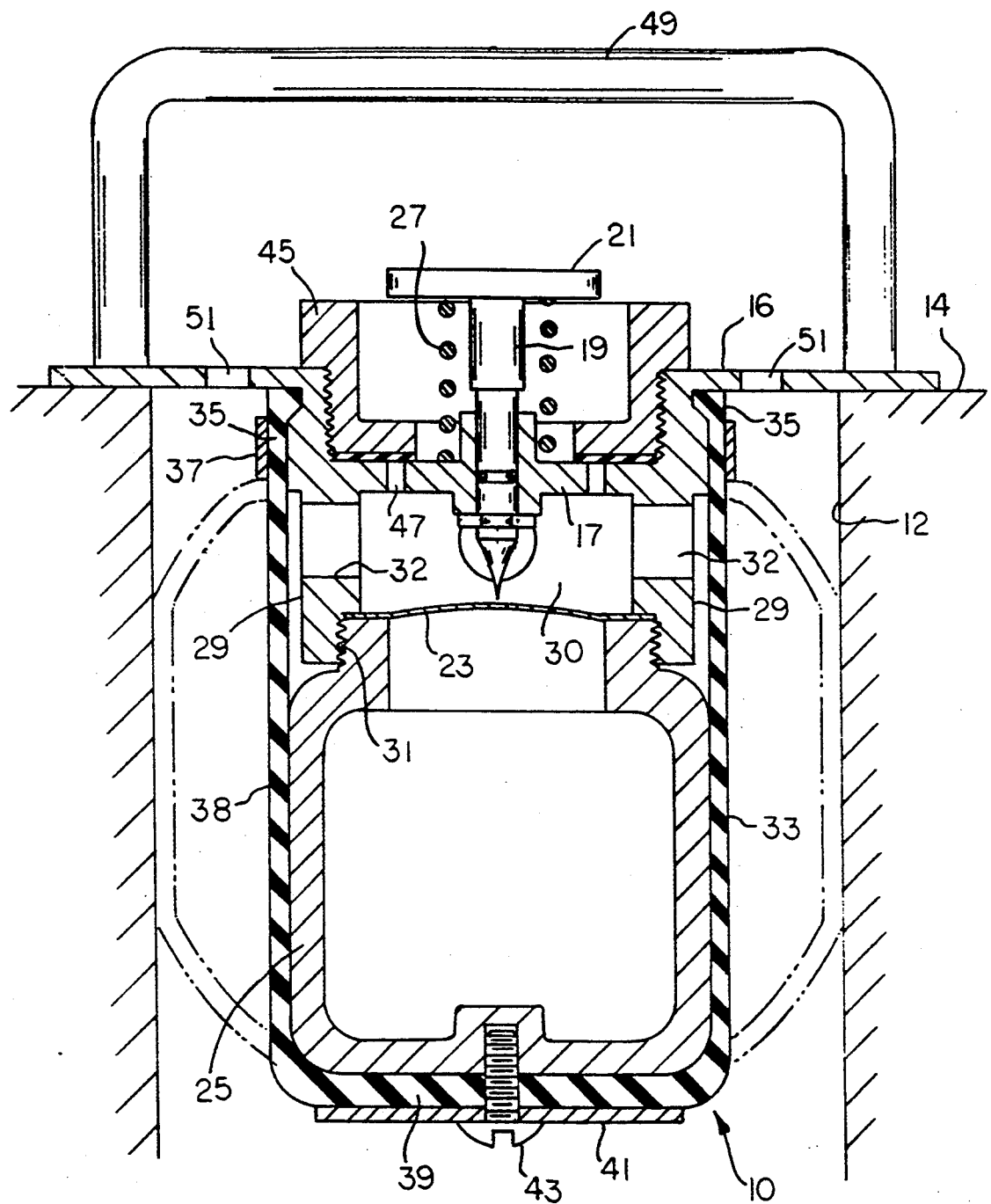

INFLATABLE ELASTOMERIC VALVE HAVING A SPHERICAL CONFIGURATION

BACKGROUND OF THE PRESENT INVENTION

The present invention relates to inflatable elastomeric valves.

The present invention further relates to a portable inflatable valve insertable into a drain hole in a building floor to prevent downflow of liquid through the hole. The valve is especially designed for use in emergency situations for the containment of hazardous, or toxic, liquids, spilled onto the floor of a factory building during the handling or processing of such materials.

Floor drain holes leading to storm drainage pipes are often closed by portable valves of a plug-like character. One such portable valve is comprised of a multiple number of rubber disks arranged between two metal plates in a stacked configuration. A manually-turnable screw extends through the plates and rubber disks, such that when the screw is turned in a particular direction the rubber disks are axially compresses; such axial compression of the disks causes the disks to expand radially.

The rubber disk valve is placed in floor drain hole, whenever it is desired to present the flow of liquid waste material into the drain hole. One problem with such a valve is that some period of time is required to place the valve in the drain hole and turn the screw a sufficient amount to cause the rubber disks to expand radially into sealing contact with the drain hole side surface. In an emergency situation, wherein it is desired to quickly contain the spillage of hazardous or toxic liquids, there may be an undesired flow of the toxic liquid down the drain hole prior to the valve sealing against the drain hole surface.

The present invention relates to a portable inflatable valve, usable in a floor drain hole to quickly seal the hole, e.g., within a second after the valve is actuated. The valve is designed for use in containing toxic or hazardous liquids that might be spilled onto a building floor in the vicinity of the drain hole. It should be noted that the present invention may also be used to seal drain holes located outside of buildings, i.e. streets, etc.

The valve of the present invention comprises an inflatable elastomeric sock surrounding pressurized gas cylinder. When the valve is inserted into a drain hole, a needle-type plunger can be operated to release pressurized gas from the cylinder into the elastomeric sock, thereby inflating the elastomeric sock into sealed engagement with the drain hole surface. The valve actuation process is relatively quick, i.e., requiring less than one second to seal the drain hole opening.

Prior to the present invention, various gas-actuated valves have been proposed, and will be discussed.

U.S. Pat. No. 4,911,586, shows a valve that comprises an inflatable balloon element having a hollow stem attachable to an air pump, whereby the balloon can be inflated into sealed engagement with the surface of a hole in the ground at a construction site. The valve has a handle for inserting the balloon into the hole.

U.S. Pat. No. 4,349,046, shows a plug-type valve insertable into a hole in the ground for sealing the hole against the upward flow of subsurface ground water through the hole. The valve comprises an outer expansible sleeve surrounding an inner rigid sleeve that houses a gas canister. An electrically-actuated valve on the canister is operated from a remote location to release pressurized gas from the canister so as to inflate the expandable sleeve.

U.S. Pat. No. 4,021,265, shows a tube-cleaning apparatus having a gas pressure-inflatable wiper element at one end. The inflated wiper element can be moved back and forth in the tube to achieve a cleaning action on the tube interior surface. Apparently the upper element has only a light frictional contact with the tube surface, not a pressure sealing contact.

U.S. Pat. No. 4,203,473 shows a leakage test apparatus for plastic drain lines. The apparatus includes an inflatable bulb-like element insertable into a drain line, and having a hollow air stem extending to a point outside the line. Pressurized air form an external source can be introduced onto the air stem to inflate the bulb-like element.

U.S. Pat. No. 3,019,819, shows a disk-type valve insertable into a gas main to interrupt the flow of gas. The peripheral edge of the valve disk includes an inflatable tube that is connectable to a small diameter flexible gas line, such that pressurized gas can be supplied to the tube to provide a seal around the edge of the valve disk.

U.S. Pat. No. 3,990,464 shows a valve that includes an inflatable bag attached at one end to a gas canister. The valve is disposed in building a ventilation duct for closing the duct when the duct is in an unsafe condition filled with smoke or flame. A temperature-sensitive control device is mounted on the canister for inflating the bag when the duct temperature becomes too high.

SUMMARY OF THE PRESENT INVENTION

An object of the present invention is to provide an inflatable elastomeric valve.

A further object of the present invention is to provide a portable inflatable valve insertable into a drain hole in a building floor to prevent downflow of liquid through the hole.

The present invention provides a portable valve that can be placed in a floor drain to prevent downflow of liquid through the drain under certain conditions, e.g., when the liquid is toxic or hazardous. The valve comprises an elastomeric sock attached to a support structure that is adapted to be placed on the building floor over the drain. A manual plunger (or needle) is slidably supported on the support structure for downward motion into a foil-type closure on a gas canister located within the elastomeric sock. Downward motion of the plunger punctures the foil closure, whereby pressurized gas is released into the elastomeric sock. The sock is thus inflated to a sealed engagement with the side surface of the drain hole. The valve is a quick-acting valve having a rapid response to manual actuation force on the actuation plunger.

In summary, and in accordance with the above discussion, the foregoing objectives are achieved in the following embodiments.

1. A portable elastomeric valve for a floor drain hole, comprising a rigid support structure adapted to be positioned on a floor over an associated drain hole;

a gas cylinder located below said support structure for disposition within the drain hole;

a tubular spacer means depending from said rigid support structure for spacing the gas cylinder downwardly from said support structure;

said gas cylinder having a puncturable closure located within said tubular spacer means;

an upright manually-operable plunger slidably mounted on said rigid support structure for downward motion through the tubular spacer means, whereby said plunger is enabled to puncture said closure to release pressurized gas from said cylinder into the space circumscribed by said tubular spacer means;

an elastomeric sock having a lower closed end wall underlying said gas cylinder, and an upper mouth affixed to said rigid support structure;

and said elastomeric sock encircling said spacer means and said cylinder, whereby pressurized gas is enabled to flow from said spacer means outwardly into said sock, so as to inflate the sock into sealing engagement with the surface of the associated drain hole.

2. The valve, as described in paragraph 1, and further comprising a handle extending upwardly from said support structure for manual manipulation of the valve.

3. The valve, as described in paragraph 1, and further comprising means for clamping the closed end wall of said elastomeric sock to the lower end of said gas cylinder, whereby said sock closed end wall remains immovable during the sock inflation process.

4. The valve, as described in paragraph 1, wherein said gas cylinder has an annular side wall, and said elastomeric sock has an annular side wall in contact with the gas cylinder side wall prior to release of the pressurized gas from the cylinder.

5. The valve, as described in paragraph 1, and further comprising a pressure relief means communicating with the space circumscribed by said tubular spacer means, whereby the elastomeric sock can be deflated to permit removal of the valve from the associated drain hole.

6. The valve, as described in paragraph 5, wherein said pressure relief means comprises a hollow annular knob surrounding said plunger.

7. The valve, as described in paragraph 6, wherein said hollow knob has a threaded engagement with said rigid support structure.

8. The valve, as described in paragraph 1, wherein said tubular spacer means comprises a tubular wall having a plurality of radial openings therein for transporting pressurized gas outwardly into pressure contact with the elastomeric sock.

9. The valve, as described in paragraph 8, wherein said tubular wall has a threaded lower end; and said gas cylinder having a threaded neck screwed into the threaded end of said tubular wall to mount the cylinder below the rigid support structure.

10. The valve, as described in paragraph 1, wherein said elastomeric sock has a length dimension parallel to the plunger axis, and a diameter dimension normal to the plunger axis; and the length dimension of said sock being about one and one-half times its diameter dimension, whereby the sock approaches a spherical condition when it is inflated into sealing engagement with the drain hole surface.

A BRIEF DESCRIPTION OF THE DRAWINGS

The single FIGURE is a sectional view taken through a portable valve constructed according to the present drawings.

DESCRIPTION OF THE PREFERRED EMBODIMENTS OF THE PRESENT INVENTION

The single FIGURE is a sectional view, taken through a portable valve constructed according to the present invention.

The drawing shows a valve 10 of the present invention, installed in a drain hole 12 that extends downwardly from a building floor surface 14. The drain hole is of conventional construction; typically the drain hole 12 will have a circular cross section, such that the hole side surface is cylindrical.

Valve 10 comprises a rigid support structure 16 adapted to rest on floor surface 14 over the drain hole 12. Support structure 16, has a central depressed wall portion 17, locatable below the plane of floor surface 14. A manual plunger 19, having a disk-like pad 21 on its upper end, is slidably supported in a guide opening in central portion 17 of the support structure 16.

The lower end of plunger 19 has a sharpened needle point, whereby downward motion of the plunger 19 from its illustrated position, enables the plunger 19 to puncture a metal foil closure 23 on the upper end of a cylindrical gas canister (or cylinder) 25. Coil spring 27 normally holds plunger 19 in the illustrated position, out of contact with closure 23. Downward manual pressure on pad 21 drives the plunger 19 downward to puncture closure 23, thereby releasing the pressurized gas into the space 30 above the closure 23.

Gas cylinder 25, is spaced below support structure 16, by means of a tubular spacer 29 depending downwardly from the depressed wall portion 17 of support structure 16. The lower end of spacer 29 is internally threaded, as at 31, for attachment of gas cylinder 25. A screw thread on the neck of cylinder 25 screws into threaded area 31 to rigidly affix the gas cylinder 25 to spacer 29. The gas cylinder 25 can be removed and replaced with another cylinder when the cylinder is no longer usable, i.e., when the pressurized gas has been previously released to operated the valve 10.

An elastomeric sock 33, encircles gas cylinder 25 and the tubular spacer 29. Sock 23 has an upper mouth area 35 that is clamped to support structure 16 by means of base clamp 37. Sock 33 comprises an annular sleeve-like side wall 38 telescoped around the side surface of gas cylinder 25, and a lower closed end wall 39 underlying the lower end of gas cylinder 25. Elastomeric end wall 39 is clamped to the cylinder end wall by means of a clamping plate 41 and screw 43.

Tubular spacer 29 has four or mare radial openings 32 therein, whereby pressurized gas can flow from circumscribed space 30, radically outwardly against the interior surface of elastomeric sock 33. The sock 33 is thus inflated to a condition sealed against the side surface of drain hole 12. The dashed lines in the drawing illustrate the position of the elastomeric sock 33 in its inflated condition.

The elastomeric sock 33 is sized so that in its inflated condition it approaches a spherical shape, as shown in dashed lines in the drawing. The length of the sock 33 (parallel to the plunger 19 axis) is about one and one-half times the sock diameter (measured when the sock is inflated). Such dimensioning of the sock 33 enables the sock to have an approximately spherical shape when it is inflated. The exact shape of the inflated sock os related to the radial clearance between the sock side surface and the hole surface. Such radial clearance can vary without adversely affecting the sealing action of the sock. One advantage of the valve is its ability to be used with various different size drain holes.

Sock 33 is constructed so that its side wall has a telescopic fit in essentially direct contact with the side wall of gas cylinder 25. With such an arrangement there is minimal vacant space between closure 23 and the interior surface of sock 33. When the closure 23 is punctured a substantial percentage of the gas will be used to inflate and pressurize the sock 33, and only a small percentage of the released gas will be located in space 30 within tubular spacer 29. Because sock 33 has its lower end wall 39 clamped to gas cylinder 25, the sock end wall 39 will remain immovable during the sock inflation process. Sock expansion will, therefore, be confined to the sock side wall 38.

The sock inflation process will normally be such that sock side wall 38 is effectively 'locked' to the hole side surface, thereby, providing an effective sealing action. In order to permit manual removal of the valve 10 from the drain hole, the valve has a gas pressure-relief means communicating with space 30 above foil closure 23. As shown in the drawing, the gas pressure relief means comprises a hollow annular knob 45 located within the central depressed portion of support structure 16. Knob 45 has a threaded side surface meshed with a threaded surface on structure 16, such that the knob 45 can be manually rotated around the plunger 19 axis to elevate the knob 45 away from depressed wall portion 17. The lower end face of knob 45 has a rubber coating thereon, which normally seals against relief holes 47 in wall portion 17. When the knob 45 is elevated from wall portion 17, relief holes 47 communicate with the external atmosphere, thereby relieving the pressure in elastomeric sock 33. The sock 33 returns to its deflated condition (as shown in the drawing), such that the valve 10 can be lifted out of the drain hole in floor surface 14.

As an optional feature, the valve can be equipped with a U-shaped lifter handle 49. Use of the handle 49 facilitates quick disposition of the valve in the drain hole, or quick removal of the valve form the drain hole. Flow openings 51 may be provided in the plate portion of support structure 16 to permit liquid flow into the drain hole 12, while still keeping the valve in a standing position in the drain hole.

The present invention, as described above, relates to a portable inflatable elastomeric valve having a spherical configuration.

Features of the present invention are recited in the appended claims. The drawings contained herein necessarily depict structural features and embodiments of the portable inflatable elastomeric valve, useful in the practice of the present invention.

However, it will be appreciated by those skilled in the arts pertaining thereto, that the present invention can be practiced in various alternate forms and configurations.

Further, the previous detailed descriptions of the preferred embodiments of the present invention are presented for purposes of clarity of understanding only, and no unnecessary limitations should be implied therefrom. Finally, all appropriate mechanical and functional equivalents to the above, which may be obvious to those skilled in the arts pertaining thereto, are considered to be encompassed within the claims of the present invention.

What is claimed is:

1. A portable elastomeric valve for a floor drain hole, comprising a rigid support structure adapted to be positioned on a floor over an associated drain hole;

a gas cylinder located below said support structure for disposition within the drain hole;

a tubular spacer means depending from said rigid support structure for spacing the gas cylinder downwardly from said support structure;

said gas cylinder having a puncturable closure located within said tubular spacer means;

an upright manually-operable plunger slidably mounted on said rigid support structure for downward motion through the tubular spacer means, whereby said plunger is enabled to puncture said closure to release pressurized gas from said cylinder into a space circumscribed by said tubular spacer means;

an elastomeric sock having a lower closed end wall underlying said gas cylinder, and an upper mouth affixed to said rigid support structure; and said elastomeric sock encircling said spacer means and said cylinder, whereby pressurized gas is enabled to flow from the spacer means outwardly into said sock so as to inflate the sock into sealing engagement with a surface of the associated drain hole.

2. The valve, as described in claim 1, and further comprising a handle extending upwardly from said support structure for manual manipulation of the valve.

3. The valve, as described in claim 1, and further comprising means for clamping the closed end wall of said elastomeric sock to a lower end of said gas cylinder, whereby said sock closed end wall remains immovable during the sock inflation process.

4. The valve, as described in claim 1, wherein said gas cylinder has an annular side wall, and said elastomeric sock has an annular side wall in contact with the gas cylinder side wall prior to release of the pressurized gas from the cylinder.

5. The valve, as described in claim 1, and further comprising a pressure relief means communicating with the space circumscribed by said tubular spacer means, whereby the elastomeric sock can be deflated to permit removal of the valve from the associated drain hole.

6. The valve, as described in claim 5, wherein said pressure relief means comprises a hollow annular knob surrounding said plunger.

7. The valve, as described in claim 6, wherein said hollow knob has a threaded engagement with said rigid support structure.

8. The valve, as described in claim 1, wherein said tubular spacer means comprises a tubular wall having a plurality of radial openings therein for transporting pressurized gas outwardly into pressure contact with the elastomeric sock.

9. The valve, as described in claim 8, wherein said tubular wall has a threaded lower end; said gas cylinder having a threaded neck screwed into the threaded end of said tubular wall to mount the cylinder below the rigid support structure.

10. The valve, as described in claim 1, wherein said elastomeric sock has a length dimension parallel to the plunger, and a diameter dimension normal to the plunger; and the length dimension of said sock being about one and one-half times its diameter dimension, whereby the sock approaches a spherical condition when it is inflated into sealing engagement with the drain hole surface.

* * * * *